United States Patent
Kim et al.

(10) Patent No.: US 10,515,556 B2
(45) Date of Patent: Dec. 24, 2019

(54) FLIGHT PATH CALCULATING AND SEARCHING METHOD OF A UNMANNED AERIAL VEHICLE WITH REGENERATIVE FUEL CELLS AND SOLAR CELLS FOR HIGH ALTITUDE LONG ENDURANCE, AND A SEARCHING APPARATUS THEREOF

(71) Applicant: KOREA INSTITUTE OF ENERGY RESEARCH, Daejeon (KR)

(72) Inventors: Minjin Kim, Daejeon (KR); Young-jun Sohn, Daejeon (KR); Seung-gon Kim, Daejeon (KR); Gu-gon Park, Daejeon (KR); Byungchan Bae, Daejeon (KR); Sung-dae Yim, Daejeon (KR); Seok-hee Park, Daejeon (KR); Tae-hyun Yang, Daejeon (KR); Won-yong Lee, Daejeon (KR); Chang-soo Kim, Incheon (KR); Moon-Yong Cha, Busan (KR)

(73) Assignee: Korea Institute of Energy Research, Daejeon (KR)

( * ) Notice: Subject to any disclaimer, the term of this patent is extended or adjusted under 35 U.S.C. 154(b) by 223 days.

(21) Appl. No.: 15/435,225

(22) Filed: Feb. 16, 2017

(65) Prior Publication Data

US 2017/0236427 A1   Aug. 17, 2017

(30) Foreign Application Priority Data

Feb. 17, 2016   (KR) .................. 10-2016-0018561

(51) Int. Cl.
*B64C 39/02*   (2006.01)
*B64D 27/24*   (2006.01)
(Continued)

(52) U.S. Cl.
CPC ............ *G08G 5/0034* (2013.01); *B60L 58/30* (2019.02); *B64C 39/024* (2013.01); *B64D 27/24* (2013.01);
(Continued)

(58) Field of Classification Search
CPC ............... B60L 11/00; B64C 2201/021; B64C 2201/042; B64C 2201/066; B64C 39/024;
(Continued)

(56) References Cited

U.S. PATENT DOCUMENTS

2012/0109563 A1   5/2012   Haam et al.

FOREIGN PATENT DOCUMENTS

| KR | 1020120109563 A | 10/2012 |
|----|-----------------|---------|
| WO | 2011075707 A1   | 6/2011  |

OTHER PUBLICATIONS

Lubkowski et al., Trade-off Analysis of Regenerative Power Source for Long Duration Loitering Airship, Proceedings of the 2010 IEEE, Systems and Information Engineering Design Symposium, University of Virginia, Charlottesville, VA, USA, Apr. 23, 2010.*

(Continued)

*Primary Examiner* — Jerrah Edwards
(74) *Attorney, Agent, or Firm* — McCoy Russell LLP

(57) ABSTRACT

Provided is a flight path calculating method for high altitude long endurance of an unmanned aerial vehicle based on regenerative fuel cells and solar cells according to an exemplary embodiment of the present invention may include a modeling step, a simulation step, and an analyzing step, and may be configured in a program form executed by an arithmetic processing means including a computer. a flight path searching method and a flight path searching apparatus for performing continuous flight path re-searching on the basis of information measured in real time during a flight of the unmanned aerial vehicle in the stratosphere to change a (Continued)

flight path so that the unmanned aerial vehicle may permanently perform long endurance in the stratosphere is provided.

18 Claims, 14 Drawing Sheets

(51) Int. Cl.
    *G08G 5/00*     (2006.01)
    *H01M 8/04298*     (2016.01)
    *H01M 8/18*     (2006.01)
    *H02J 3/38*     (2006.01)
    *G05D 1/00*     (2006.01)
    *B60L 58/30*     (2019.01)
    *B64D 41/00*     (2006.01)

(52) U.S. Cl.
CPC ......... *G05D 1/0005* (2013.01); *G08G 5/0069* (2013.01); *H01M 8/04305* (2013.01); *H01M 8/186* (2013.01); *H02J 3/383* (2013.01); *H02J 3/387* (2013.01); *B60L 2200/10* (2013.01); *B64C 2201/021* (2013.01); *B64C 2201/042* (2013.01); *B64C 2201/066* (2013.01); *B64D 2041/005* (2013.01); *B64D 2211/00* (2013.01); *H01M 2250/20* (2013.01); *H01M 2250/402* (2013.01); *Y02B 90/12* (2013.01); *Y02T 90/32* (2013.01)

(58) Field of Classification Search
CPC .. B64D 2211/00; B64D 27/24; G05D 1/0005; G08G 5/0034; G08G 5/0069; H01M 2250/20; H01M 2250/402; H01M 8/04305; H01M 8/186; H02J 3/383; H02J 3/387; Y02B 90/12; Y02T 90/32
See application file for complete search history.

(56) References Cited

OTHER PUBLICATIONS

Youngblood, J. et al., "Design of Long-Endurance Unmanned Airplanes Incorporating Solar and Fuel Cell Propulsion," Proceedings of the AIAA/SAE/ASME 20th Joint Propulsion Conference, Jun. 11, 1984, Cincinnati, Ohio, 11 pages.

Bradley, T. et al., "Energy Management for Fuel Cell Powered Hybrid-Electric Aircraft," Proceedings of the 7th International Energy Conversion Engineering Conference, Aug. 2, 2009, Denver, Colorado, 22 pages.

European Patent Office, Extended European Search Report Issued in Application No. 17156747.2, dated Sep. 15, 2017, Germany, 10 pages.

* cited by examiner

FLIGHT PATH CALCULATING AND SEARCHING METHOD OF A UNMANNED AERIAL VEHICLE WITH REGENERATIVE FUEL CELLS AND SOLAR CELLS FOR HIGH ALTITUDE LONG ENDURANCE, AND A SEARCHING APPARATUS THEREOF

CROSS-REFERENCE TO RELATED APPLICATIONS

This application claims priority under 35 U.S.C. § 119 to Korean Patent Application No. 10-2016-0018561, filed on Feb. 17, 2016, in the Korean Intellectual Property Office, the entire disclosure of which is incorporated herein by reference in its entirety for all purposes.

TECHNICAL FIELD

The following disclosure relates to a flight path calculating method for high altitude long endurance of an unmanned aerial vehicle based on regenerative fuel cells and solar cells. More particularly, the following disclosure relates to a flight path calculating method for high altitude (stratospheric) long endurance of an unmanned aerial vehicle (UAV) based on regenerative fuel cells and solar cells capable of calculating the most appropriate flight path by comparing and analyzing amounts of consumed hydrogen and oxygen and amounts of generated hydrogen and oxygen in the unmanned aerial vehicle based on the regenerative fuel cells and the solar cells depending on various flight strategies through a simulation in order to continuously perform the high altitude long endurance of the unmanned aerial vehicle based on the regenerative fuel cells and the solar cells.

BACKGROUND

A high altitude (stratospheric) long endurance hybrid unmanned aerial vehicle (UAV) may perform civil duties such as meteorological observation, aerial shot, communication relay, disaster observation, Internet network construction, and the like, as well as military duties such as wider monitoring and reconnaissance at an altitude higher than that of an existing aircraft operated at the atmosphere. In addition, since the stratospheric long endurance hybrid unmanned aerial vehicle is operated at an altitude lower than that of an artificial satellite, maintenance and management of the stratospheric long endurance hybrid unmanned aerial vehicle are easy, and data loss and delay may be minimized.

Since a meteorological change is not substantially present in the stratosphere unlike the atmosphere, stability, which is one of the most important elements in operating an aircraft, may be secured in the stratosphere. In addition, since a larger amount of solar energy may be obtained in the stratosphere than in the atmosphere, a solar cell system constituting a hybrid unmanned aerial vehicle may generate a larger amount of power in the stratosphere.

Therefore, in the case in which the unmanned aerial vehicle is operated in the stratosphere, duty efficiency may be improved, such that a service may be continuously provided.

Several study teams all over the world have developed an unmanned aerial vehicle in which a hybrid system is used. The National Aeronautics and Space Administration (NASA) has developed Pathfinder series and Helios, which are high altitude long endurance hybrid unmanned aerial vehicles, in ERAST Project up to 2003. These unmanned aerial vehicles use a hybrid system of a solar cell, a battery, and a fuel cell, and the like, to aim to be flown at an altitude of about 15 km to 30 km (50000 ft to 100000 ft) for at least twenty four hours. The Pathfinder-Plus has a total weight of 315 kg and a wing area of 87.12 $m^2$ and has arrived at an altitude of about 24 km (80000 ft), and the Helios has a total weight of 929 kg and a wing area of 183.58 $m^2$ and has arrived at an altitude of about 29.5 km (96863 ft).

The Thales Alenia Space has developed StratoBus, which is a high altitude long endurance hybrid unmanned aerial vehicle having an airship form. This airship uses a hybrid system of a solar cell, a battery, a proton exchange membrane fuel cell (PEMFC), and a water electrolyzer to aim to stay in the sky of 20 km for long endurance such as five years or more.

The Boeing has developed Solar Eagle capable of staying in the sky of 20 km for long endurance such as five years or more by using a hybrid system of a solar cell, a solid oxide fuel cell (SOFC), and a water electrolyzer.

The Zephyr of the Qinetiq has used a hybrid system of a solar cello and an Li—S battery to arrive at an altitude of 21.562 km on July, 2010 and achieve a long endurance record of 336 hours and 22 minutes.

However, in spite of the development of the stratospheric long endurance hybrid unmanned aerial vehicles described above, there are still issues that should be solved for the purpose of long endurance operation of the stratospheric long endurance hybrid unmanned aerial vehicles in the stratosphere.

First, it is impossible to additionally supply fuel to the unmanned aerial vehicle in the stratosphere, and in the case of using a solar cell system, power may not be generated during the night in which solar energy is not present. Therefore, an auxiliary power system is necessarily required. In addition, the stratospheric long endurance unmanned aerial vehicle should be able to ensure extreme conditions such as a very low temperature of 56.5° C. below zero, a strong ultraviolet ray, a low air density, and the like. Particularly, since lift force of the unmanned aerial vehicle is smaller in the stratosphere than in the atmosphere under a low air density condition, the unmanned aerial vehicle should be manufactured at a very light weight or a wing area of the unmanned aerial vehicle should be increased, in order to fly the unmanned aerial vehicle in the stratosphere.

To this end, in a flight path calculating method for high altitude long endurance of an unmanned aerial vehicle based on regenerative fuel cells and solar cells according to an exemplary embodiment of the present invention, both of a regenerative fuel cell system and a solar cell system are used in the unmanned aerial vehicle, such that hydrogen and oxygen may be generated using surplus energy remaining after the solar cell system supplies an output required by the unmanned aerial vehicle to the unmanned aerial vehicle during the daytime through a water electrolysis system of the regenerative fuel cells, and power may be generated using the hydrogen and the oxygen generated during the daytime through a fuel cell system of the regenerative fuel cells during the night in which the solar cell system may not be operated. Water generated through an electrochemical reaction in the fuel cells is used to generate the hydrogen and the oxygen through electrolysis in a water electrolysis stack. Therefore, the unmanned aerial vehicle using a hybrid system of the regenerative fuel cells and the solar cells according to an exemplary embodiment of the present invention does not require the additional supply of fuel due to reuse of fuel, such that it may be a good solution for solving the problems described above.

In addition, specific energy of the regenerative fuel cell system is 400 to 1000 Wh/kg, which is higher than 240 Wh/kg corresponding to specific energy of a lithium-ion battery system. This means that the regenerative fuel cell system is lighter than the lithium-ion battery system in providing the same energy.

Therefore, in the case in which the regenerative fuel cells are used in the unmanned aerial vehicle, the unmanned aerial vehicle may be manufactured at a weight lighter than that of an unmanned aerial vehicle using a battery.

In order to calculate a flight path for high altitude long endurance of an unmanned aerial vehicle based on regenerative fuel cells and solar cells, a simulation is performed on various flight paths while changing modes of level, climb, and glide flights after the daytime and the night are distinguished from each other, to compare amounts of consumed hydrogen and oxygen and amounts of generated hydrogen and oxygen for various flight strategies with each other, thereby making it possible to calculate an optimized flight path through which long endurance operation of the unmanned aerial vehicle in the stratosphere is possible.

Meanwhile, Korean Patent Laid-Open Publication No. 10-2012-0109563 (entitled "High Altitude Long Endurance Unmanned Aircraft and Methods of Operation Thereof" and hereinafter referred to as Related Art Document 1) has disclosed a high altitude long endurance unmanned aerial vehicle having high altitude base station maintaining capability, but does not mention the problems described above and a method for solving the problems described above at all.

RELATED ART DOCUMENT

Patent Document 1

Korean Patent Laid-Open Publication No. 10-2012-0109563 (published on Oct. 8, 2012)

SUMMARY

An embodiment of the present invention is directed to providing a flight path calculating method for high altitude (stratospheric) long endurance of an unmanned aerial vehicle (UAV) based on regenerative fuel cells and solar cells capable of calculating the most appropriate flight path by comparing and analyzing amounts of consumed hydrogen and oxygen and amounts of generated hydrogen and oxygen in the unmanned aerial vehicle based on the regenerative fuel cells and the solar cells depending on various flight strategies through a simulation in order to continuously perform the high altitude long endurance of the unmanned aerial vehicle based on the regenerative fuel cells and the solar cells.

In one general aspect, a flight path calculating method for high altitude long endurance of an unmanned aerial vehicle based on regenerative fuel cells and solar cells, configured in a program form executed by an arithmetic processing means including a computer includes: a modeling step (S100) of performing modeling by receiving design variables of a regenerative fuel cell system and a solar cell system supplying required power for the high altitude long endurance of the unmanned aerial vehicle based on regenerative fuel cells and solar cells; a simulation step (S200) of performing a simulation for amounts of consumed hydrogen and oxygen and amounts of generated hydrogen and oxygen on a plurality of preset flight paths having a change in a flight altitude using the regenerative fuel cell system and the solar cell system depending on a modeling result in the modeling step (S100); and an analyzing step (S300) of calculating a flight path most appropriate for the high altitude long endurance of the unmanned aerial vehicle based on regenerative fuel cells and solar cells using a simulation result value for the amounts of consumed hydrogen and oxygen and the amounts of generated hydrogen and oxygen depending on the plurality of preset flight paths having the change in the flight altitude in the simulation step (S200).

At the time of a climb flight of the unmanned aerial vehicle based on regenerative fuel cells and solar cells, required power may be defined $P_{climb}=TV=DV+WV \sin \theta$ through the following motion Equation:

$$T = D + W \sin \theta$$

at the time of a level flight of the unmanned aerial vehicle based on regenerative fuel cells and solar cells, required power may be defined as $$P_{level} = TV = \sqrt{\frac{2W^3 C_D^2}{\rho S C_L^3}}$$

through the following motion Equation:

$$T = D = \frac{W}{C_L/C_D},$$

and at the time of a glide flight of the unmanned aerial vehicle based on regenerative fuel cells and solar cells, glide velocity may be defined as $$V_{glide} = \sqrt{\frac{2W \cos \theta}{\rho S C_L}}$$

through the following lift force Equation:

$$L = W \cos \theta = \frac{1}{2} \rho V^2 S C_L,$$

where T is thrust force of the unmanned aerial vehicle,
D is drag force of the unmanned aerial vehicle,
L is lift force of the unmanned aerial vehicle, and
V is aircraft velocity of the unmanned aerial vehicle.

In the simulation step (S200), for each of the plurality of preset flight paths having the change in the flight altitude, a simulation for amounts of hydrogen and oxygen generated using surplus energy remaining after the solar cell system supplies energy required in the unmanned aerial vehicle to the unmanned aerial vehicle through a water electrolysis system of the regenerative fuel cells during the daytime and amounts of hydrogen and oxygen consumed through the fuel cell system of the regenerative fuel cells during the night may be performed.

In the analyzing step (S300), altitudes at which the long endurance of the unmanned aerial vehicle is possible and times in which the long endurance of the unmanned aerial vehicle is possible may be analyzed for each of the preset flight paths using a simulation performing result value in the simulation step (S200) to calculate the flight path most appropriate for the high altitude long endurance of the unmanned aerial vehicle.

DETAILED DESCRIPTION OF MAIN ELEMENTS

Figure 1:
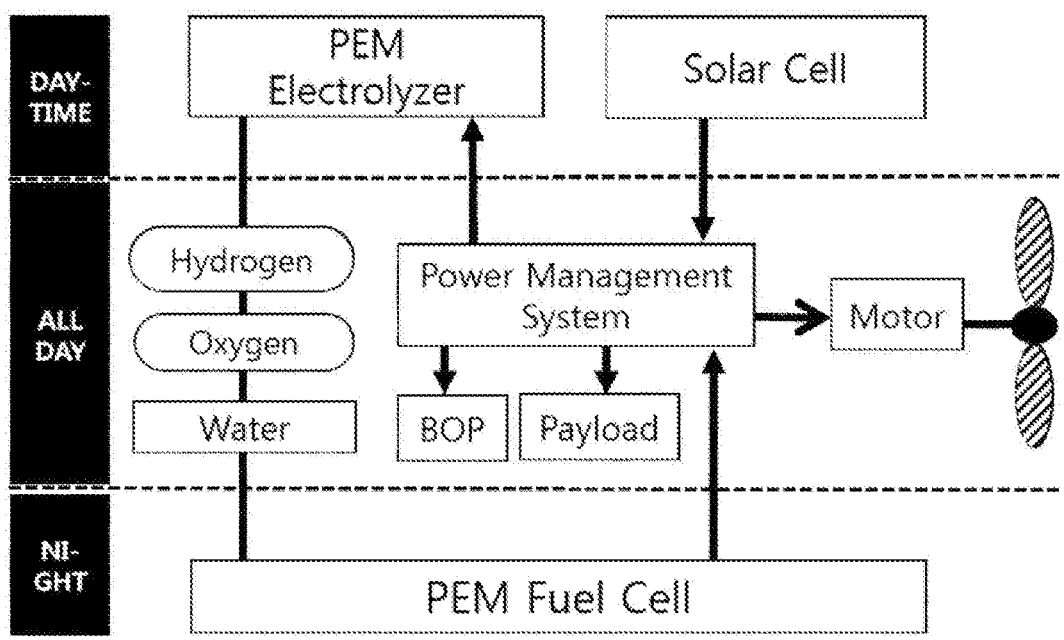
FIG. 1 is a configuration diagram illustrating a regenerative fuel cell system and a solar cell system of an unmanned aerial vehicle based on regenerative fuel cells and solar cells according to an exemplary embodiment of the present invention.

S100 to S300: respective steps of flight path calculating method for high altitude long endurance of unmanned aerial vehicle based on regenerative fuel cells and solar cells according to an exemplary embodiment of the present invention S1100 to S1600: respective steps of flight path searching method for high altitude long endurance of unmanned aerial vehicle based on regenerative fuel cells and solar cells according to an exemplary embodiment of the present invention

| 10: | flight path searching apparatus | 20: | first measuring unit | 30: | modeling unit |
|---|---|---|---|---|---|
| 40: | calculating unit | 50: | specifying unit | | |
| 60: | changing unit | | | | |
| 70: | second measuring unit | | | | |

DETAILED DESCRIPTION OF EMBODIMENTS

Hereinafter, a flight path calculating method for high altitude long endurance of an unmanned aerial vehicle based on regenerative fuel cells and solar cells according to an exemplary embodiment of the present invention will be described in detail with reference to the accompanying drawings. The accompanying drawings to be provided below are provided by way of example so that the idea of the present invention can be sufficiently transferred to those skilled in the art to which the present invention pertains. Therefore, the present invention is not limited to the accompanying drawings to be provided below, but may be implemented in other forms. In addition, like reference numerals denote like elements throughout the specification.

Technical terms and scientific terms used in the present specification have the general meaning understood by those skilled in the art to which the present invention pertains unless otherwise defined, and a description for the known function and configuration unnecessarily obscuring the gist of the present invention will be omitted in the following description and the accompanying drawings.

Conventionally, a hybrid unmanned aerial vehicle capable of performing high altitude long endurance is flown using solar energy as a main energy source, is flown during the night in which sun is not present using a battery or a fuel cell as a backup power source, and performs a role such as meteorological observation, military information collection, or a communication base.

An unmanned aerial vehicle using solar cells and fuel cells is cheaper than an artificial satellite, and may perform long endurance since an amount of solar radiation energy becomes high as an altitude becomes high, but required power of the unmanned aerial vehicle becomes high due to a low air density and temperature and it is difficult to manage water of the fuel cells. Therefore, the unmanned aerial vehicle using solar cells and fuel cells may be flown at a low altitude for only a short time, and high altitude long endurance of the unmanned aerial vehicle using solar cells and fuel cells is difficult.

In an unmanned aerial vehicle based on regenerative fuel cells and solar cells according to an exemplary embodiment of the present invention, hydrogen and oxygen may be generated using surplus energy remaining after a solar cell system supplies an output required by the unmanned aerial vehicle to the unmanned aerial vehicle during the daytime through a water electrolysis system of the regenerative fuel cells, and power may be generated using the hydrogen and the oxygen generated during the daytime through a fuel cell system of the regenerative fuel cells during the night in which the solar cell system may not be operated. Water generated through an electrochemical reaction in the fuel cells is used to generate the hydrogen and the oxygen through electrolysis in a water electrolysis stack. Therefore, the unmanned aerial vehicle based on regenerative fuel cells and solar cells according to an exemplary embodiment of the present invention does not require the additional supply of fuel, such that it may be a good solution for solving the problems described above.

However, up to now, actually, there is no case of succeeding in long endurance of an unmanned aerial vehicle at a high altitude using the regenerative fuel cells.

Therefore, in the flight path calculating method for high altitude long endurance of an unmanned aerial vehicle based on regenerative fuel cells and solar cells according to an exemplary embodiment of the present invention, in order to calculate a flight path for high altitude long endurance of an unmanned aerial vehicle based on regenerative fuel cells and solar cells, a simulation is performed on various flight paths while changing modes of level, climb, and glide flights after the daytime and the night are distinguished from each other, to compare amounts of consumed hydrogen and oxygen and amounts of generated hydrogen and oxygen for various flight strategies with each other, thereby making it possible to calculate an optimized flight path through which long endurance operation of the unmanned aerial vehicle in the stratosphere is possible.

In detail, under the assumption that long endurance of the unmanned aerial vehicle is possible when fuel to be used during the night is generated during the daytime through a regenerative fuel cell system, as surplus energy (remaining energy except energy required for a flight in generated solar energy) that may be operated through a water electrolyzer of the regenerative fuel cell system during the daytime is increased or required flight power consumed through the fuel cell system during the night is decreased, amounts of hydrogen and oxygen generated through the regenerative fuel cell system are increased, such that high altitude long endurance of the unmanned aerial vehicle is possible.

In this case, required flight energy required in the unmanned aerial vehicle is a function of a wing area, an air density, a weight, and a wing shape, but there is a trade-off among the wing area, the weight, and the wing shape, and thus, it may be the easiest required flight energy managing method to fly the unmanned aerial vehicle while changing the air density (altitude).

As an altitude becomes high, an air density becomes small, such that large required flight energy is required, but potential energy becomes large, such that a glide flight (required flight energy at the time of the glide flight is '0') may be performed for a long period of time. Therefore, when a glide flight time becomes a maximum value, the unmanned aerial vehicle has minimum required flight energy. Accordingly, an assumption that long endurance is impossible when a hydrogen and oxygen regeneration rate through the water electrolyzer does not become 100% for the maximum glide flight time is established.

In addition, when long endurance is possible for the maximum glide flight time, an optimal flight path in which an appropriate glide flight, level flight, and climb flight are combined with one another is calculated, thereby making it possible to perform high altitude long endurance.

Therefore, in the flight path calculating method for high altitude long endurance of an unmanned aerial vehicle based on regenerative fuel cells and solar cells according to an exemplary embodiment of the present invention, after the regenerative fuel cells and the solar cells are modeled, a simulation is performed on various flight paths, thereby making it possible to calculate a flight path most appropriate for the high altitude long endurance.

Figure 2:
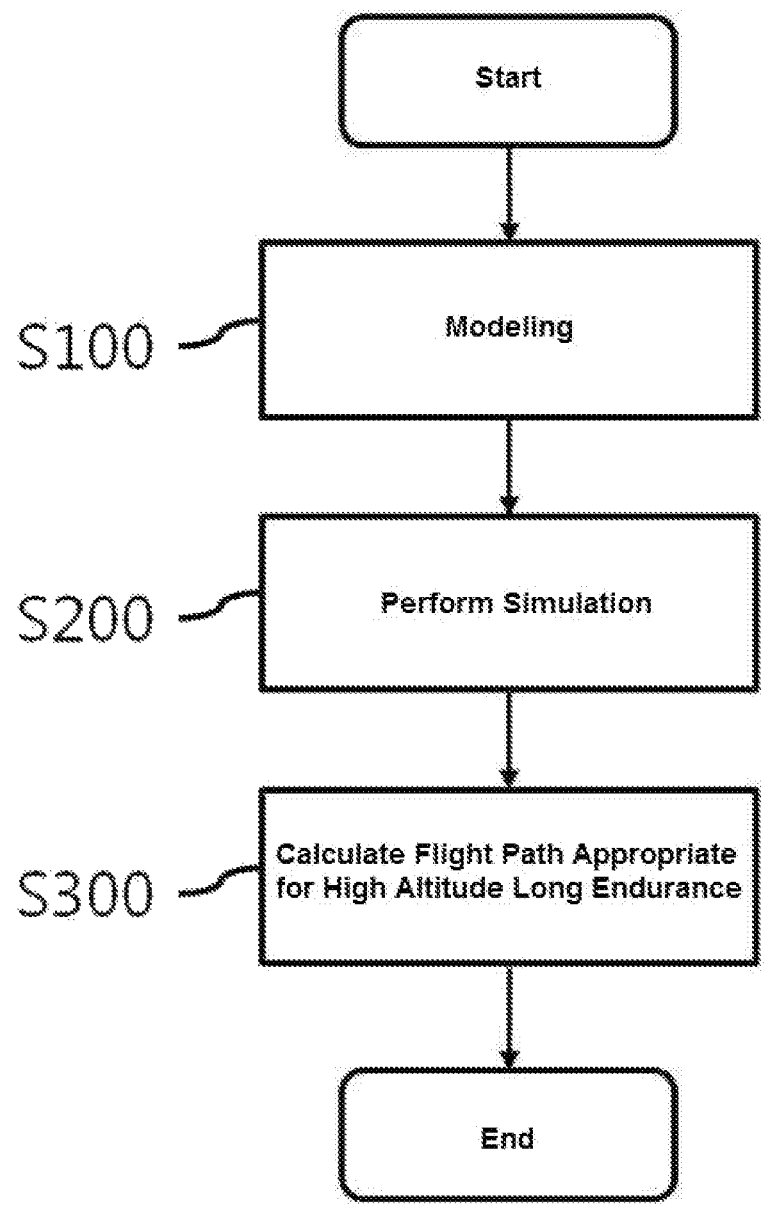
FIG. 2 is a flow chart illustrating a flight path calculating method for high altitude long endurance of an unmanned aerial vehicle based on regenerative fuel cells and solar cells according to an exemplary embodiment of the present invention.

FIG. 2 is a flow chart illustrating a flight path calculating method for high altitude long endurance of an unmanned aerial vehicle based on regenerative fuel cells and solar cells according to an exemplary embodiment of the present invention. The flight path calculating method for high altitude long endurance of an unmanned aerial vehicle based on regenerative fuel cells and solar cells according to an exemplary embodiment of the present invention will be described in detail with reference to FIG. 2.

The flight path calculating method for high altitude long endurance of an unmanned aerial vehicle based on regenerative fuel cells and solar cells according to an exemplary embodiment of the present invention may include a modeling step (S100), a simulation step (S200), and an analyzing step (S300), and may be configured in a program form executed by an arithmetic processing means including a computer.

Figure 3:
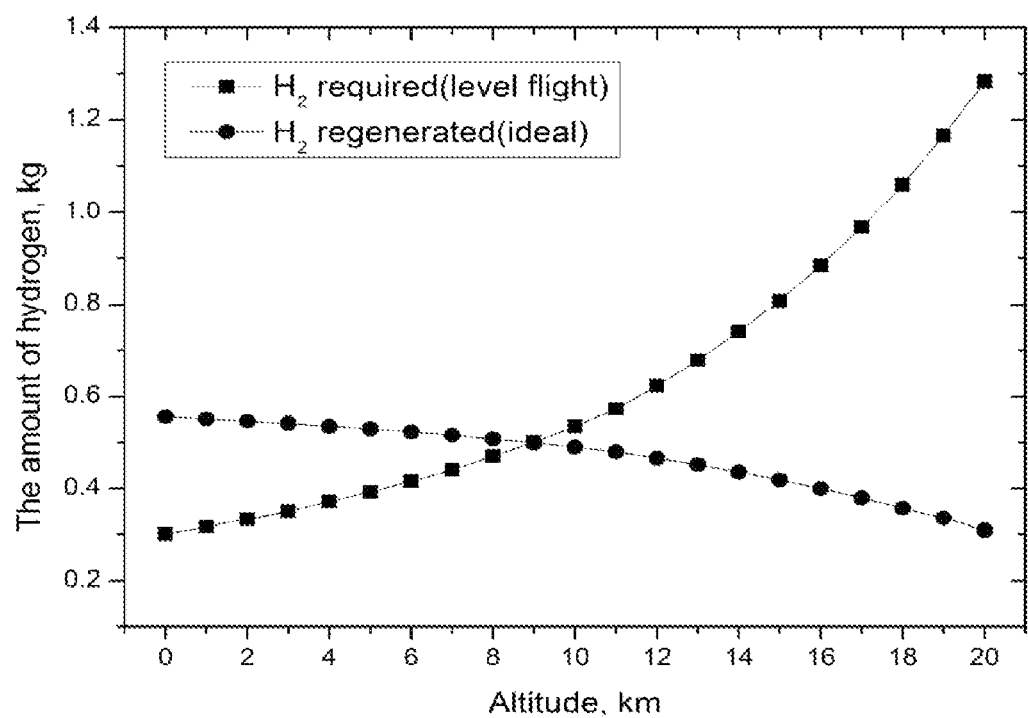
FIG. 3 is a view illustrating amounts of consumed hydrogen and amounts of generated hydrogen depending on flight altitudes of an unmanned aerial vehicle based on regenerative fuel cells and solar cells according to an exemplary embodiment of the present invention.

FIG. 3 is a view illustrating amounts of generated hydrogen and amounts of consumed hydrogen depending on altitudes when the unmanned aerial vehicle based on regenerative fuel cells and solar cells according to an exemplary embodiment of the present invention performs a level flight of which a flight trajectory is most stable. As illustrated in FIG. 3, required power in the unmanned aerial vehicle at the time of the level flight is in inverse proportion to a square root of an air density and is thus exponentially increased as an altitude becomes high. As illustrated in FIG. 3, since amounts of hydrogen used at night are less than amounts of hydrogen regenerated in the daytime at an altitude up to about 9 km, long endurance of the unmanned aerial vehicle is possible, but long endurance of the unmanned aerial vehicle at a high altitude such as the stratosphere is impossible.

The respective steps will be described in detail. In the modeling step (S100), modeling may be performed by receiving design variables of the regenerative fuel cell system and the solar cell system supplying required power for the high altitude long endurance of the unmanned aerial vehicle based on regenerative fuel cells and solar cells.

In the unmanned aerial vehicle based on regenerative fuel cells and solar cells, as illustrated in FIG. 1, hydrogen and oxygen may be generated using surplus energy remaining after a solar cell system supplies an output required by the unmanned aerial vehicle to the unmanned aerial vehicle during the daytime through a water electrolysis system of the regenerative fuel cells, and power may be generated using the hydrogen and the oxygen generated during the daytime through a fuel cell system of the regenerative fuel cells during the night in which the solar cell system may not be operated. Water generated through an electrochemical reaction in the fuel cells is used to generate the hydrogen and the oxygen through electrolysis in a water electrolysis stack.

In this case, specific energy of the regenerative fuel cell system is 400 to 1000 Wh/kg, which is higher than 240 Wh/kg corresponding to specific energy of a lithium-ion battery system. This means that the regenerative fuel cell system is lighter than the lithium-ion battery system in providing the same energy.

Therefore, in the case in which the regenerative fuel cells are used in the unmanned aerial vehicle, the unmanned aerial vehicle may be manufactured at a weight lighter than that of an unmanned aerial vehicle using a battery.

In the modeling step (S100), the unmanned aerial vehicle based on regenerative fuel cells and solar cells is modeled so that the regenerative fuel cell system of the unmanned aerial vehicle based on regenerative fuel cells and solar cells generates power required in the unmanned aerial vehicle through the fuel cells for the night, and transfers water generated in the fuel cells to the water electrolyzer and the water electrolyzer may convert the water into hydrogen and oxygen and transfer the hydrogen and the oxygen to a tank.

Figure 4:
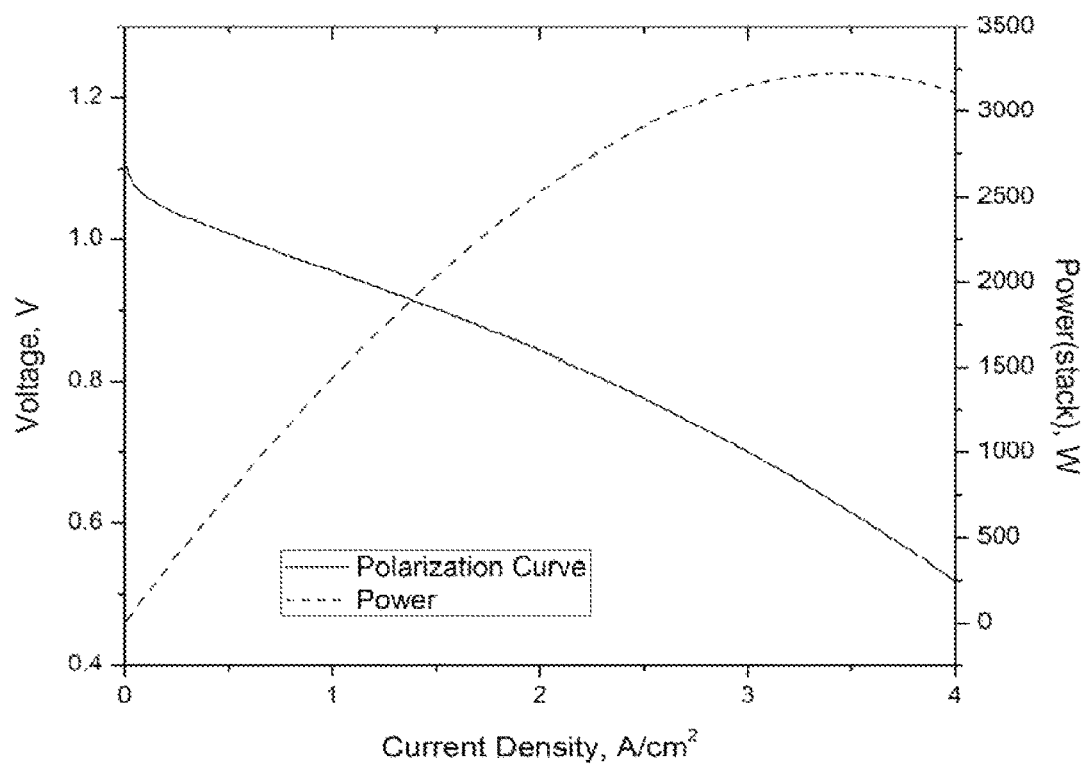
FIG. 4 is a view illustrating a polarization curve of a fuel cell system modeled by a modeling step (S100) of the flight path calculating method for high altitude long endurance of an unmanned aerial vehicle based on regenerative fuel cells and solar cells according to an exemplary embodiment of the present invention.

In the modeling step (S100), modeling of the fuel cells is performed after it is assumed that consumed power of a balance of plant (BOP) is 10% of generated power of the fuel cells, all the water generated in the fuel cells may be recovered, and performance of the water electrolyzer is 52 kWh/kg $H_2$. FIG. 4 is a graph illustrating a polarization curve of the fuel cells modeled by the modeling step (S100).

The following Table 1 is a table representing parameters for performing modeling calculation of the fuel cells in the modeling step (S100).

TABLE 1

| Character | Description | Value | Unit |
|---|---|---|---|
| T | Temperature | 343 | K |
| $P_a$, $P_c$ | Pressure(anode, cathode) | 3 | atm |
| $D_{H2, H20}$ | Effective hydrogen diffusivity | 0.149 | $cm^2$/s |
| $D_{O2, H20}$ | Effective oxygen diffusivity | 0.0295 | $cm^2$/s |
| $D_\lambda$ | Water diffusivity in Nafion | 3.81*$10^{-6}$ | $cm^2$/s |
| $J_0$ | Exchange current density | 1*$10^{-4}$ | A/$cm^2$ |
| $t^M$ | Electrolyte thickness | 80 | μm |
| $t^A$, $t^C$ | Anode/cathode thickness | 250 | μm |
| α | Transfer coefficient | 0.5 | — |
| $P_{SAT}$ | Vapor saturation pressure | 0.307 | atm |
| $\eta_{solar}$ | Efficiency of a solar cell | 0.18 | — |
| $\eta_{motor}$ | Efficiency of a motor | 0.9 | — |
| $\eta_{pro}$ | Efficiency of a propulsion system | 0.85 | — |
| $\eta_{PMS}$ | Efficiency of a power management system | 0.9 | — |

In the modeling step (S100), modeling of the fuel cells of the unmanned aerial vehicle based on regenerative fuel cells and solar cells may be performed.

In detail, in the modeling step (S100), the modeling may be performed using the following Equations:

$$E_{FC} = E_{Nernst} - \eta_{act} - \eta_{ohm} - \eta_{trans}$$

$$E_{Nernst} = -\left(\frac{\Delta H}{nF} - \frac{T\Delta S}{nF}\right) + \frac{RT}{nF}\ln\left(\frac{P_{H2}P_{O2}^{0.5}}{P_{H2O}}\right)$$

$$\eta_{act} = \frac{RT}{4\alpha F}\ln\left[\frac{j}{j_o P^c X_{O2|d} - t^c jRT/(4FP^c D_{O2,N2}^{eff})}\right]$$

$$\eta_{ohm} = j \times ASR_{ohm}$$

$$\eta_{trans} = \frac{RT}{nF}\ln\frac{j_L}{j_L - j}.$$

(Here, $E_{FC}$: energy generated from fuel cell, Wh,
$E_{Nernst}$: energy in nernstian condition,
$\eta_{act}$: Activation overpotential,
$\eta_{ohmic}$: Ohmic overpotential,
$\eta_{trans}$: transport overpotential,
H: enthalpy,
T: temperature, ° C., K,
S: entropy,
R: gas constant, J/(mol*K),
n: number of electrons,
F: Faraday constant, C/mol,
α: transfer coefficient,
j: current density, A/$cm^2$,
$j_o$: Exchange current density, A/$cm^2$,
$P^C$: Cathode pressure, atm,
$ASR_{ohmic}$: area-specific resistance, Ω$cm^2$,
$j_L$: limiting current density, A/$cm^2$,
$t^C$: Cathode thickness,
$D_{O_2H_2O}^{eff}$: Effective oxygen diffusivity, $cm^2$/s)

In addition, in the modeling step (S100), the solar cell system may be modeled since the unmanned aerial vehicle based on regenerative fuel cells and solar cells uses solar radiation energy through the solar cells.

The following Table 2 is a table representing parameters for performing modeling calculation of the solar cells in the modeling step (S100).

TABLE 2

| Character | Description | Value(unit) |
|---|---|---|
| Φ | The latitude of location | 35° N |
| $d_n$ | The day number of the year | 273 |
| ε | Eccentricity ratio of earth | 0.0167 |

Figure 5:
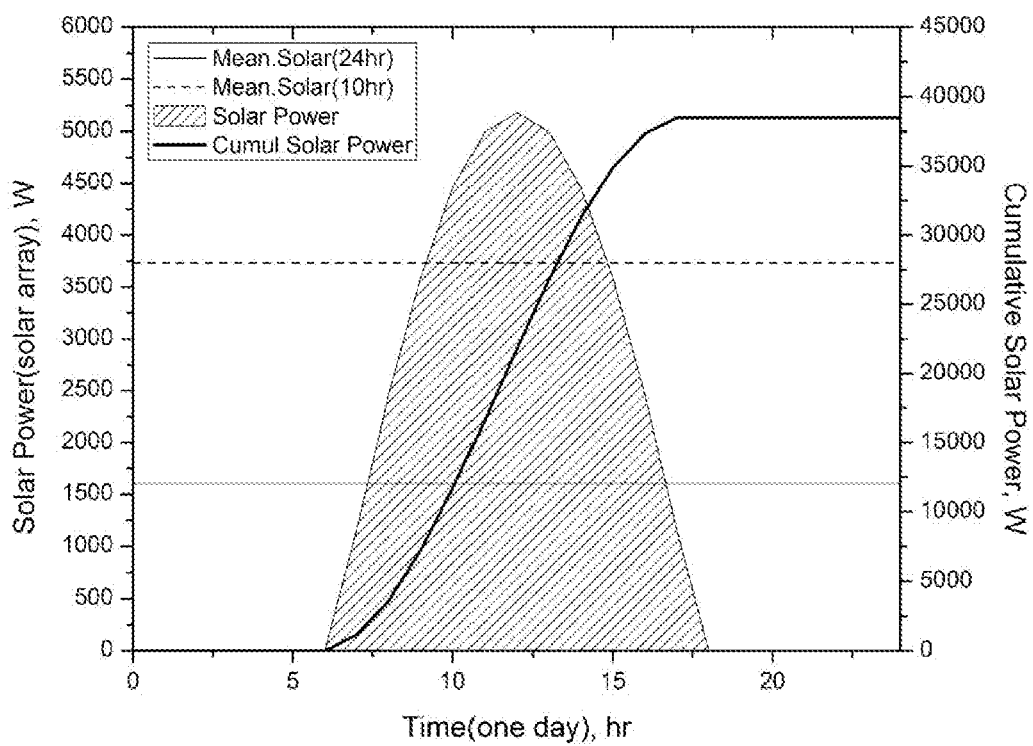
FIG. 5 is a view illustrating an amount of solar light that may be operated for one day in an unmanned aerial vehicle based on regenerative fuel cells and solar cells according to an exemplary embodiment of the present invention.

Through the modeling of the solar cell system in the modeling step (S100), the unmanned aerial vehicle based on regenerative fuel cells and solar cells may obtain energy of 5183 W, which is maximum solar power, at noon at which the sun stands at its meridian altitude, in illustrated in FIG. 5.

In this case, since the solar cells installed in the unmanned aerial vehicle based on regenerative fuel cells and solar cells may not vertically receive solar light due to a wing shape, such that they are inclined at about 25 degrees. Therefore, solar energy corresponding to 85% of solar energy obtained in the case in which the solar cells are vertically disposed may be obtained. In addition, it is preferable that it is assumed that solar cell efficiency is 0.18 and an area of a solar cell panel is 75% of a wing area of the unmanned aerial vehicle. It is preferable that mean solar power obtained for one day through the solar cells is 1604 W and mean solar power obtained for hours of sunshine (ten hours) is 3735 W.

Figure 6:
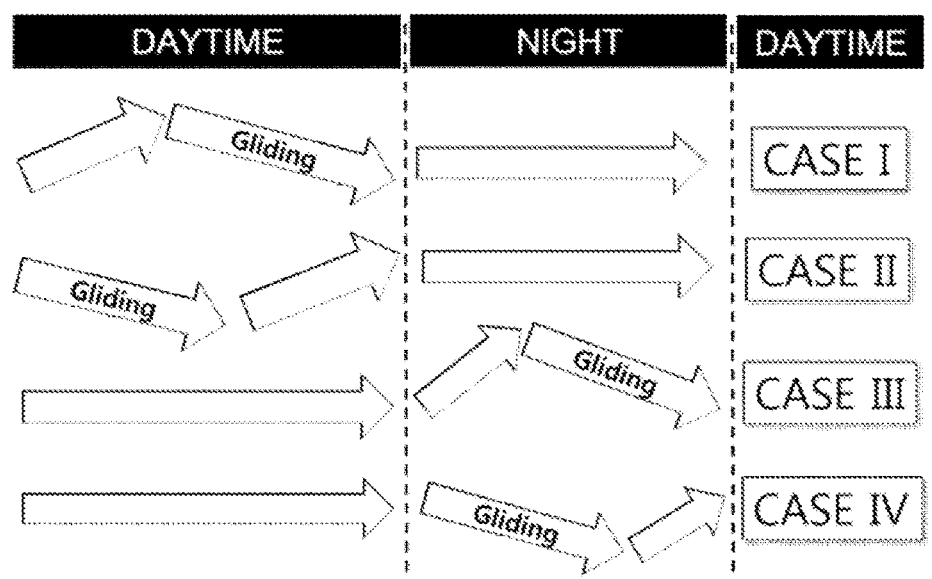
FIG. 6 is a view illustrating various flight paths on which a simulation is performed in a simulation step (S200) of the flight path calculating method for high altitude long endurance of an unmanned aerial vehicle based on regenerative fuel cells and solar cells according to an exemplary embodiment of the present invention.

In the flight path calculating method for high altitude long endurance of an unmanned aerial vehicle based on regenerative fuel cells and solar cells according to an exemplary embodiment of the present invention, the simulation may be performed on various flight paths while changing the modes of the level, climb, and glide flights of the unmanned aerial vehicle based on regenerative fuel cells and solar cells after the daytime and the night are distinguished from each other, as illustrated in FIG. 6.

In this case, the unmanned aerial vehicle based on regenerative fuel cells and solar cells basically performs the climb flight, the level flight, and the glide flight, and performs a circular flight while drawing a spiral or a circle. A motion equation of the unmanned aerial vehicle based on regenerative fuel cells and solar cells is a function of the air density, the wing area, the weight, the wing shape, and the like, as described above, and as an altitude becomes high, the air density becomes low and thus, has the largest influence on required power.

It is preferable that the unmanned aerial vehicle based on regenerative fuel cells and solar cells according to an exemplary embodiment of the present invention has an airfoil of an NACA6412 model, a weight of 150 kg, a wing area of 50 m², and a tractor propeller.

In this case, lift force (L) and drag force (D) of the unmanned aerial vehicle based on regenerative fuel cells and solar cells according to an exemplary embodiment of the present invention may be represented by the following Equations:

$$L = \tfrac{1}{2}\rho V^2 S_w C_L$$

$$D = \tfrac{1}{2}\rho V^2 S_w C_D.$$

(Here, $C_L$: lift coefficient,
$C_D$: drag coefficient,
$\rho$: air density, kg/(m*s),
V: vertical velocity,
$S_w$: wing area, m²)

At the time of the climb flight of the unmanned aerial vehicle based on regenerative fuel cells and solar cells according to an exemplary embodiment of the present invention, required power may be defined as $P_{climb} = TV = DV + WV \sin\theta$ rough the following motion Equation:

$$T = D + W \sin\theta, \text{ and}$$

at the time of the level flight of the unmanned aerial vehicle based on regenerative fuel cells and solar cells, required power may be defined as $$P_{level} = TV = \sqrt{\frac{2W^3 C_D^2}{\rho S C_L^3}}$$

through the following motion Equation:

$$T = D = \frac{W}{C_L/C_D}.$$

In addition, at the time of the glide flight of the unmanned aerial vehicle based on regenerative fuel cells and solar cells, glide velocity may be defined as $$V_{glide} = \sqrt{\frac{2W\cos\theta}{\rho S C_L}}$$

through the following lift force Equation:

$$L = W \cos\theta = \tfrac{1}{2}\rho V^2 S C_L.$$

(Here, L: lift force, N,
D: drag force, N,
W: weight, Kg,
T: thrust force, N,
V: aircraft velocity)

In the simulation step (S200), a simulation for amounts of consumed hydrogen and oxygen and amounts of generated hydrogen and oxygen depending on a plurality of preset flight paths having a change in a flight altitude may be performed on the unmanned aerial vehicle based on regenerative fuel cells and solar cells using the regenerative fuel cell system and the solar cell system depending on a modeling result in the modeling step (S100).

In detail, in the simulation step (S200), for each of the plurality of preset flight paths having the change in the flight altitude, a simulation for amounts of hydrogen and oxygen generated using surplus energy remaining after the solar cell system supplies energy required in the unmanned aerial vehicle to the unmanned aerial vehicle during the daytime through the water electrolysis system of the regenerative fuel cells and amounts of hydrogen and oxygen consumed through the regenerative fuel cell system of the regenerative fuel cells during the night is performed.

That is, an assumption that the high altitude long endurance of the unmanned aerial vehicle is possible when amounts of hydrogen and oxygen consumed during the night may be regenerated during the daytime is established.

The possibility of the high altitude long endurance of the unmanned aerial vehicle based on regenerative fuel cells and solar cells may be decided through four flight strategies as illustrated in FIG. 6 that may change an altitude.

As the four flight strategies, the unmanned aerial vehicle may be set to (1) perform the climb flight and the glide flight during the daytime and then perform the level flight during the night, (2) perform the glide flight and the climb flight during the daytime and then perform the level flight during the night, (3) perform the level flight during the daytime and then perform the climb flight and the glide flight during the night, and (4) perform the level flight during the daytime and then perform the glide flight and the climb flight during the night, but this is only an example of the present invention.

In the analyzing step (S300), a flight path most appropriate for the high altitude long endurance of the unmanned aerial vehicle based on regenerative fuel cells and solar cells may be calculated using a simulation result value for the amounts of consumed hydrogen and oxygen and the amounts of generated hydrogen and oxygen depending on the plurality of preset flight paths having the change in the flight altitude in the simulation step (S200).

In detail, in the analyzing step (S300), altitudes at which the long endurance of the unmanned aerial vehicle is possible and times in which the long endurance of the unmanned aerial vehicle is possible are analyzed for each of the preset flight paths using a simulation performing result value in the simulation step (S200), thereby making it possible to calculate the flight path most appropriate for the high altitude long endurance of the unmanned aerial vehicle.

In other words, in the analyzing step (S300), the flight path most appropriate for the high altitude long endurance of the unmanned aerial vehicle may be calculated through a combination of the flight strategies using the amounts of consumed hydrogen and oxygen and the amounts of regenerated hydrogen and oxygen depending on various flight strategies performed in the simulation step (S200).

The following analysis is performed in order to analyze the altitudes at which the long endurance of the unmanned aerial vehicle is possible for each of the preset flight paths in the analyzing step (S300).

Figure 7:
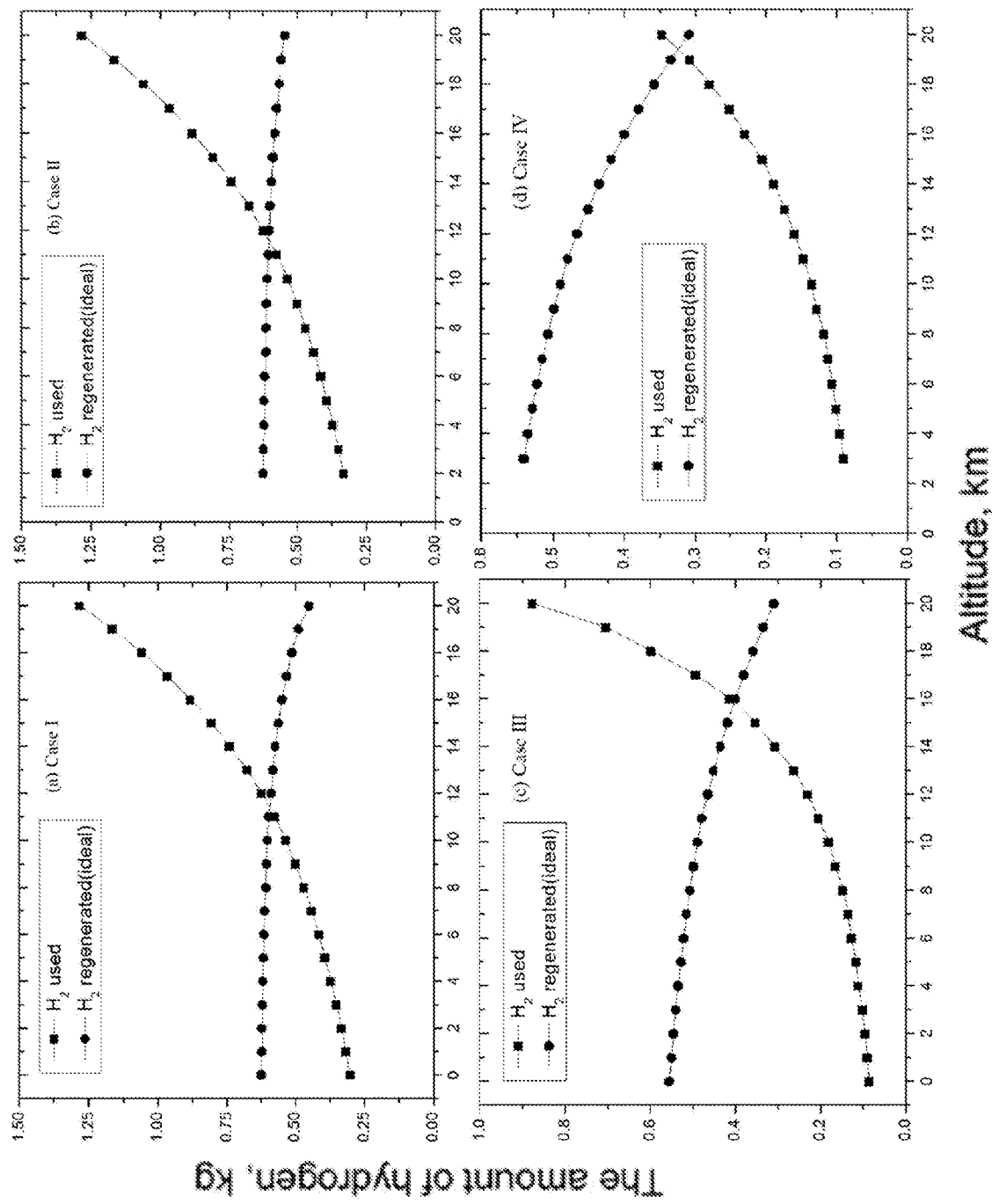
FIG. 7 is a view illustrating amounts of generated hydrogen and amounts of consumed hydrogen depending on flight altitudes for each of various flight paths analyzed in an analyzing step (S300) of the flight path calculating method for high altitude long endurance of an unmanned aerial vehicle based on regenerative fuel cells and solar cells according to an exemplary embodiment of the present invention.

FIG. 7 is a view illustrating amounts of consumed hydrogen and amounts of regenerated hydrogen depending on flight altitudes for each of preset flight paths.

As illustrated in FIG. 7, as a result of reviewing amounts of consumed hydrogen and oxygen and amounts of regenerated hydrogen and oxygen for each of flight paths of the unmanned aerial vehicle set to (1) perform the climb flight and the glide flight during the daytime and then perform the level flight during the night, (2) perform the glide flight and the climb flight during the daytime and then perform the level flight during the night, (3) perform the level flight during the daytime and then perform the climb flight and the glide flight during the night, and (4) perform the level flight during the daytime and then perform the glide flight and the climb flight during the night, the high altitude long endurance of the unmanned aerial vehicle is not performed by the four flight strategies, but in the case of a fourth flight strategy (that is, in the case in which the unmanned aerial vehicle is set to perform the level flight during the daytime and then perform the glide flight and the climb flight during the night), a reference altitude at which the long endurance of the unmanned aerial vehicle is possible is up to about 19 km, which is higher than those of the other flight strategies.

Figure 8:
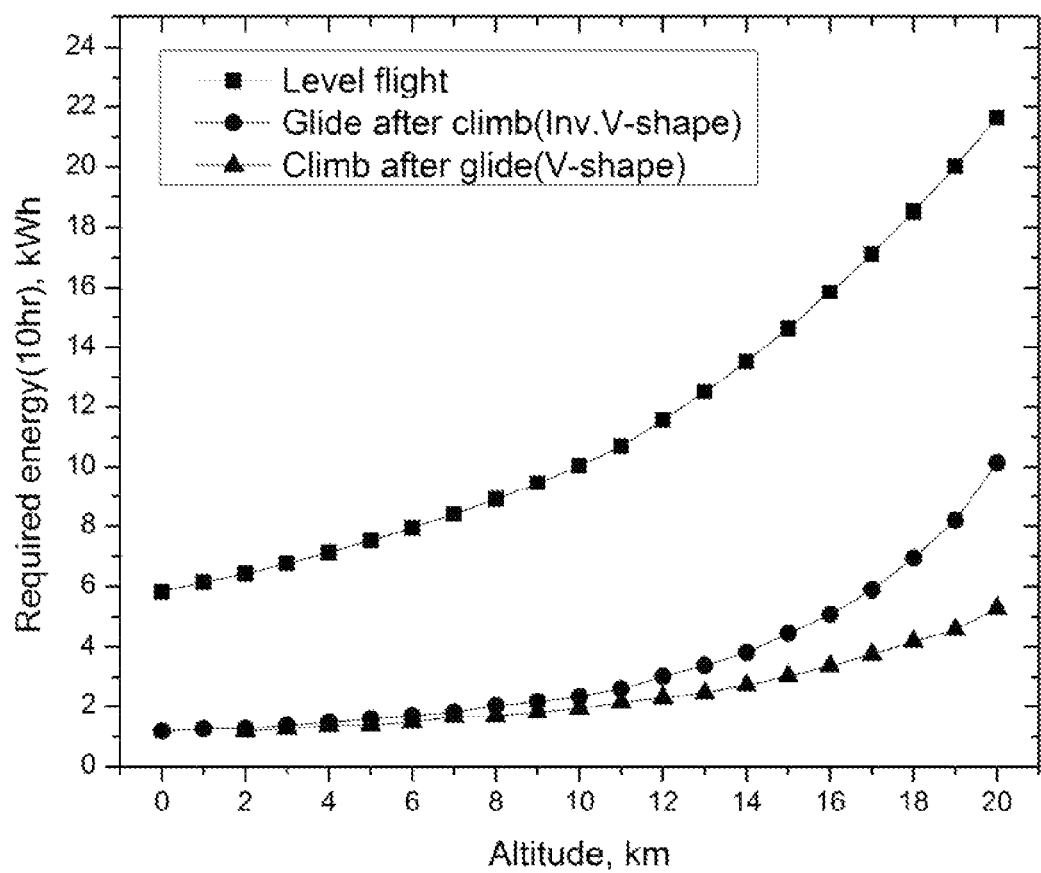
FIG. 8 is a view illustrating required flight energy required depending on flight altitudes for each of various flight paths analyzed in the analyzing step (S300) of the flight path calculating method for high altitude long endurance of an unmanned aerial vehicle based on regenerative fuel cells and solar cells according to an exemplary embodiment of the present invention.

FIG. 8 is a view illustrating required flight energy depending on flight paths. That is, FIG. 8 is a view illustrating amounts of hydrogen consumed at the time of the level flight, the glide flight after the climb flight, and the climb flight after the glide flight of the unmanned aerial vehicle. As amounts of consumed hydrogen become small, it means that required energy becomes small. Therefore, required flight energy is smaller in the glide flight after the climb flight and the climb flight after the glide flight than in the level flight, and the smallest required flight energy is required in the climb flight after the glide flight.

Figure 9:
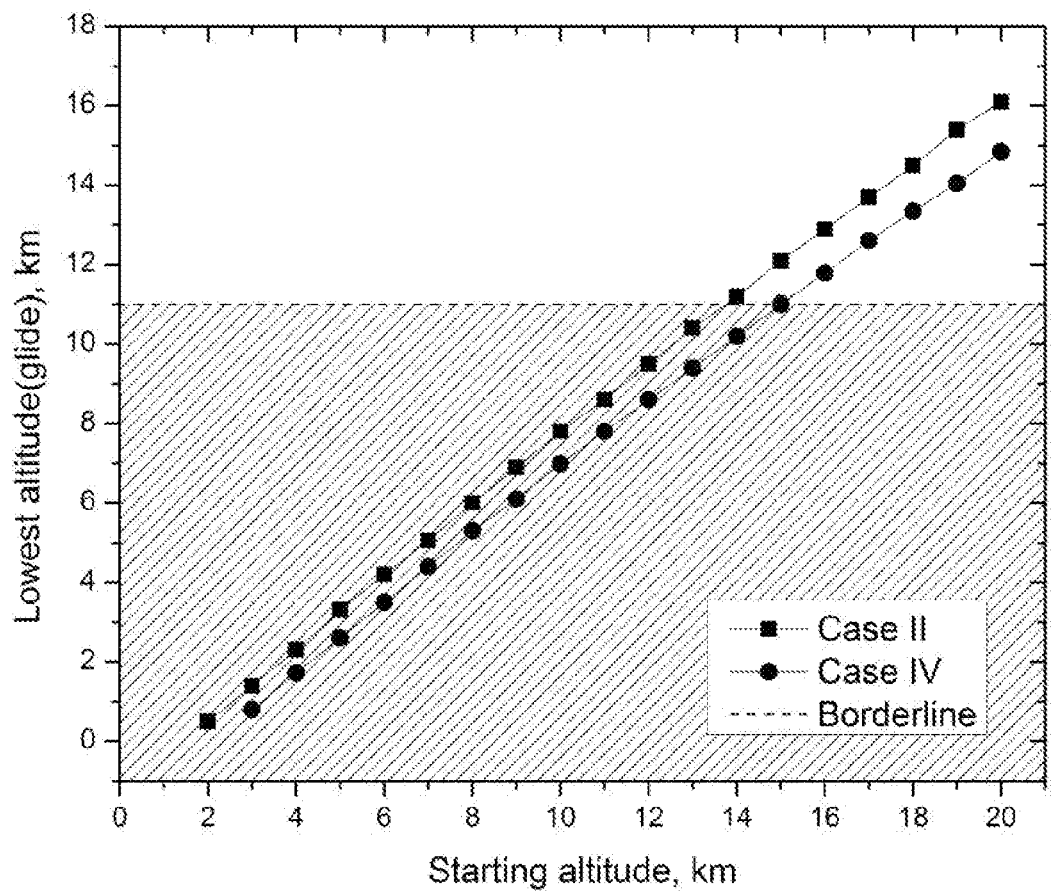
FIG. 9 is a view illustrating a reference altitude for entry into a high altitude for each of various flight paths analyzed in the analyzing step (S300) of the flight path calculating method for high altitude long endurance of an unmanned aerial vehicle based on regenerative fuel cells and solar cells according to an exemplary embodiment of the present invention.

FIG. 9 is a graph illustrating a reference altitude in order for a flight path to be present in the stratosphere by a simulation result value by the second flight strategy and the fourth flight strategy. In the case of the second flight strategy, a reference altitude is 14 km or more, and in the case of the fourth flight strategy, a reference altitude is 15 km or more.

In addition, the following analysis is performed in order to analyze the times in which the long endurance of the unmanned aerial vehicle is possible for each of the preset flight paths in the analyzing step (S300).

Figure 10:
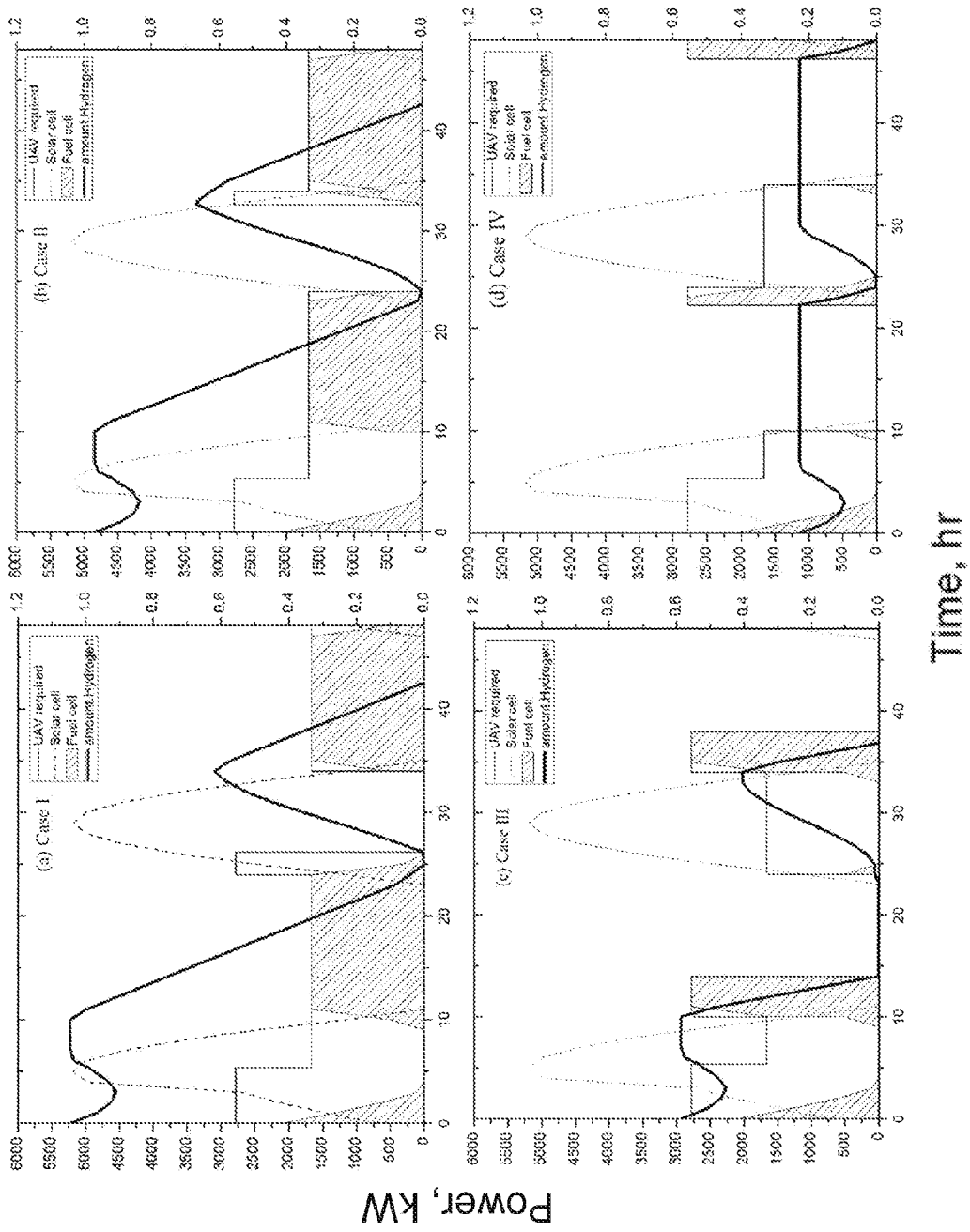
FIG. 10 is a view illustrating required flight power and amounts of hydrogen in an unmanned aerial vehicle required for 48 hours in a preset reference altitude for each of various flight paths analyzed in the analyzing step (S300) of the flight path calculating method for high altitude long endurance of an unmanned aerial vehicle based on regenerative fuel cells and solar cells according to an exemplary embodiment of the present invention.

FIG. 10 is a view illustrating required flight power and changes in amounts of hydrogen in a tank of an unmanned aerial vehicle for 48 hours in 18 km, which is a preset reference altitude, for each of the preset flight paths. Through this, the required flight power and the times in which the long endurance of the unmanned aerial vehicle is possible for each of the preset flight paths may be easily decided.

As illustrated in FIG. 10, in all of the four preset flight strategies, fuel cells were used in order to replenish insufficient solar power at the time of takeoff of the unmanned aerial vehicle, and hydrogen and oxygen used in the fuel cells were regenerated through the water electrolyzer after an altitude is stabilized.

As described above, amounts of initially charged hydrogen and oxygen are only amounts of hydrogen and oxygen that may be used for 24 hours after the takeoff of the unmanned aerial vehicle, and hydrogen and oxygen should be supplied through the water electrolyzer after takeoff. Therefore, in a flight path by a simulation result value by the fourth flight strategy, required flight power during the night is smallest, such that amounts of initially charged hydrogen and oxygen are smallest. Therefore, in the case of designing an unmanned aerial vehicle through the fourth flight strategy, amounts of initially charged hydrogen and oxygen are small, such that there is an advantage of a weight.

In addition, in the case in which amounts of hydrogen and oxygen are '0', it means that a flight ends. Therefore, it may be confirmed that a flight of the unmanned aerial vehicle for about 43 hours is possible in the first flight strategy and the second flight strategy, a flight of the unmanned aerial vehicle for about 37 hours is possible in the third flight strategy, and the long endurance of the unmanned aerial vehicle is possible in only the fourth flight strategy.

Figure 11:
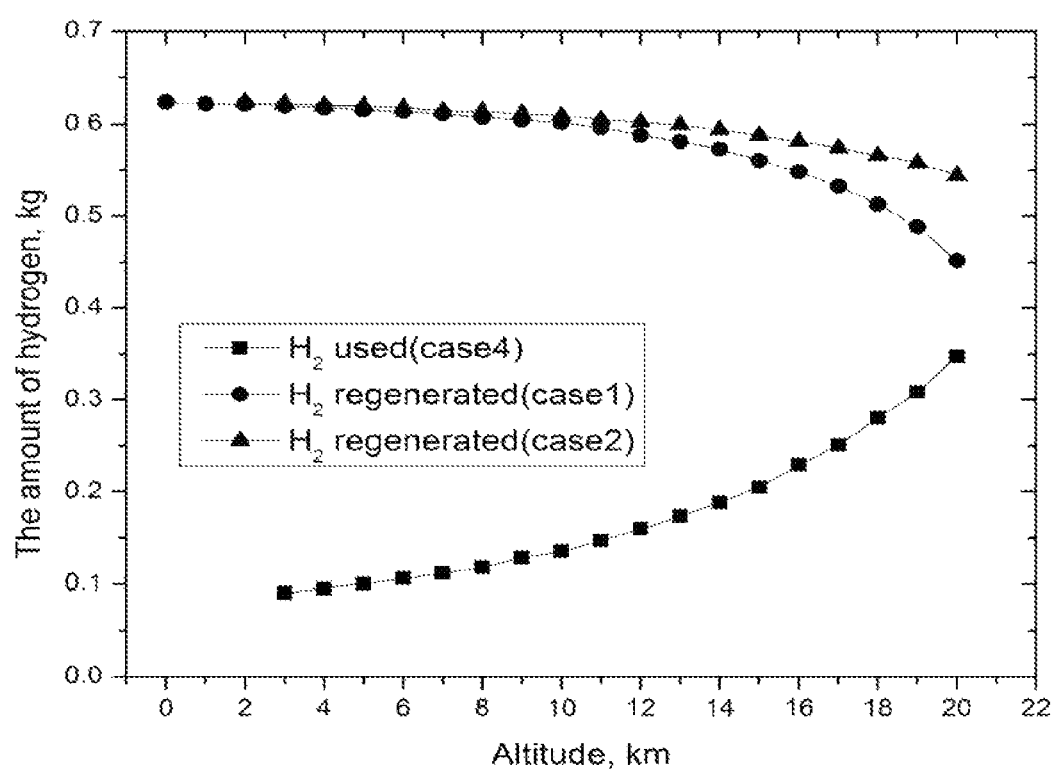
FIG. 11 is a view illustrating amounts of hydrogen required depending on flight altitudes for each of various flight paths analyzed in the analyzing step (S300) of the flight path calculating method for high altitude long endurance of an unmanned aerial vehicle based on regenerative fuel cells and solar cells according to an exemplary embodiment of the present invention.

As a result of calculating the flight path most appropriate for the high altitude long endurance of the unmanned aerial vehicle in the analyzing step (S300), in the case in which a flight strategy is designed to be the climb flight after the glide flight during the daytime and the climb flight after the glide flight during the night, corresponding to the case in which the glide flight may be performed for the longest period of time among the flight paths, as illustrated in FIG. 11, all of hydrogen and oxygen used during the night may be regenerated during the daytime, such that the long endurance of the unmanned aerial vehicle is possible.

However, in the case in which the climb flight after the glide flight during the night is performed, the long endurance of the unmanned aerial vehicle is possible at only a reference altitude of 15 km or more due to a limitation of a minimum glide altitude, but in the case in which the glide flight after the climb flight is performed, the long endurance of the unmanned aerial vehicle is possible at a reference altitude up to about 16 km. Therefore, it may be confirmed that the long endurance of the unmanned aerial vehicle is possible in the case of selecting and designing an appropriate flight path in the entire range of the stratosphere (0 to 20 km).

In other words, in the flight path calculating method for high altitude long endurance of an unmanned aerial vehicle based on regenerative fuel cells and solar cells according to an exemplary embodiment of the present invention, a flight path through which the high altitude long endurance of the unmanned aerial vehicle based on regenerative fuel cells and solar cells in the stratosphere may be achieved may be calculated, and it may be confirmed that the high altitude long endurance of the unmanned aerial vehicle is possible by appropriately controlling only the flight path in the given design of the unmanned aerial vehicle since amounts of consumed hydrogen and oxygen and amounts of regenerated hydrogen and oxygen during the daytime and the night are changed depending on the flight paths.

In the case of calculating a flight path on the basis of the flight path calculating method for high altitude long endurance of an unmanned aerial vehicle based on regenerative fuel cells and solar cells, continuous flight path re-searching may be performed on the basis of information measured in real time during an actual flight of the unmanned aerial vehicle.

Hereinafter, a flight path searching method for performing continuous flight path re-searching on the basis of information measured in real time during a flight of the unmanned aerial vehicle in the stratosphere to change a flight path so that the unmanned aerial vehicle may permanently perform long endurance in the stratosphere will be described.

Figure 12:
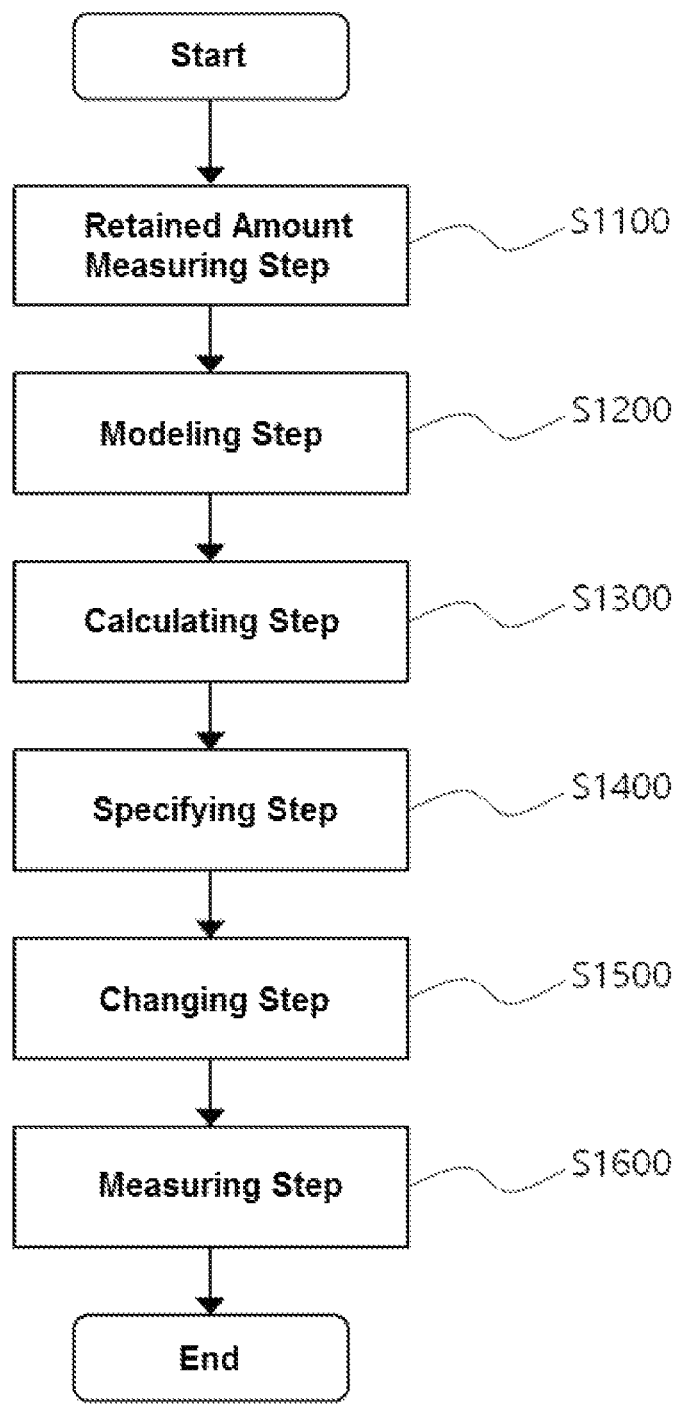
FIG. 12 is a flow chart illustrating a flight path searching method for high altitude long endurance of an unmanned aerial vehicle based on regenerative fuel cells and solar cells according to an exemplary embodiment of the present invention.

As illustrated in FIG. 12, a flight path searching method for an unmanned aerial vehicle based on regenerative fuel cells and solar cells may include: a retained amount measuring step (S1100) of measuring amounts of hydrogen and oxygen retained in a regenerative fuel cell system; a modeling step (S1200) of modeling the regenerative fuel cell system and a solar cell system supplying power required for the unmanned aerial vehicle to the unmanned aerial vehicle using design data of the regenerative fuel cell system and the solar cell system; a calculating step (S1300) of calculating required power and amounts of generated hydrogen and oxygen and consumed hydrogen and oxygen depending on a plurality of preset flight paths having a change in a flight altitude on the basis of the measured amounts of retained hydrogen and oxygen using the regenerative fuel cell system and the solar cell system depending on a modeling result; a specifying step (S1400) of specifying a flight path through which the unmanned aerial vehicle may stay for the longest time using a result value calculated in the calculating step; and a changing step (S1500) of changing a flight path of the unmanned aerial vehicle to the flight path specified in the specifying step.

The plurality of preset flight paths of the calculating step (S1300) may include a first flight path through which the unmanned aerial vehicle performs a level flight during the night and performs a glide flight after a climb flight during the daytime, a second flight path through which the unmanned aerial vehicle performs a level flight during the night and performs a climb flight after a glide flight during the daytime, a third flight path through which the unmanned aerial vehicle performs a glide flight after a climb flight during the night and performs a level flight during the daytime, and a fourth flight path through which the unmanned aerial vehicle performs a climb flight after a glide flight during the night and performs a level flight during the daytime.

In the modeling step (S1200), when ideal data are used as the design data of the regenerative fuel cell system and the solar cell system, it may be difficult to accurately predict actual amounts of generated hydrogen and oxygen or consumed hydrogen and oxygen during a flight of the unmanned aerial vehicle. Therefore, the flight path searching method for an unmanned aerial vehicle based on regenerative fuel cells and solar cells may further include a measuring step (S1600) of measuring consumed power and amounts of generated hydrogen and oxygen and consumed hydrogen and oxygen depending on the flight path during the flight of the unmanned aerial vehicle; and an updating step of updating the design data used in the modeling step using actual measured data measured in the measuring step. Therefore, accuracy of prediction of the modeling may be increased, and finally, the flight path through which the unmanned aerial vehicle may stably stay for the longest time is re-searched in real time on the basis of actual data of the unmanned aerial vehicle that is currently being flown, thereby making it possible to predict an altitude at which the long endurance of the unmanned aerial vehicle is possible and a time in which the long endurance of the unmanned aerial vehicle is possible.

As equations and calculating methods required in the modeling step (S1200) and the calculating step (S1300), the equations and the calculating methods used in the flight path calculating method described above may be used.

In the calculating step (S1300), amounts of hydrogen and oxygen generated through a water electrolyzer of the regenerative fuel cell system to which surplus energy except required power supplied to the unmanned aerial vehicle through the solar cell system is transferred during the daytime and amounts of hydrogen and oxygen consumed through the regenerative fuel cell system during the night may be calculated.

In addition, in the specifying step (S1400), the flight path through which the unmanned aerial vehicle may stay for the longest time may be specified by analyzing the altitude at which the long endurance of the unmanned aerial vehicle is possible and the time in which the long endurance of the unmanned aerial vehicle is possible depending on the preset flight path using the result value calculated in the calculating step (S1300).

In a recording medium in which a program for executing a flight path searching method for an unmanned aerial vehicle based on regenerative fuel cells and solar cells in a computer is recorded, the flight path searching method for an unmanned aerial vehicle based on regenerative fuel cells and solar cells may include: a retained amount measuring step of measuring amounts of hydrogen and oxygen retained in a regenerative fuel cell system; a modeling step of modeling the regenerative fuel cell system and a solar cell system supplying power required for the unmanned aerial vehicle to the unmanned aerial vehicle using design data of the regenerative fuel cell system and the solar cell system; a calculating step of calculating required power and amounts of generated hydrogen and oxygen and consumed hydrogen and oxygen depending on a plurality of preset flight paths having a change in a flight altitude on the basis of the measured amounts of retained hydrogen and oxygen using the regenerative fuel cell system and the solar cell system depending on a modeling result; a specifying step of specifying a flight path through which the unmanned aerial vehicle may stay for the longest time using a result value calculated in the calculating step; and a changing step of changing a flight path of the unmanned aerial vehicle to the flight path specified in the specifying step.

In addition, the recording medium may include all of the features of the flight path searching method for an unmanned aerial vehicle based on regenerative fuel cells and solar cells described above.

The unmanned aerial vehicle based on regenerative fuel cells and solar cells may include a flight path searching apparatus capable of performing continuous flight path re-searching on the basis of information measured in real time during an actual flight of the unmanned aerial vehicle.

Hereinafter, a flight path searching apparatus for performing continuous flight path re-searching on the basis of information measured in real time during a flight of the unmanned aerial vehicle in the stratosphere to specify a flight path through which the unmanned aerial vehicle may permanently perform long endurance in the stratosphere will be described.

Figure 13:
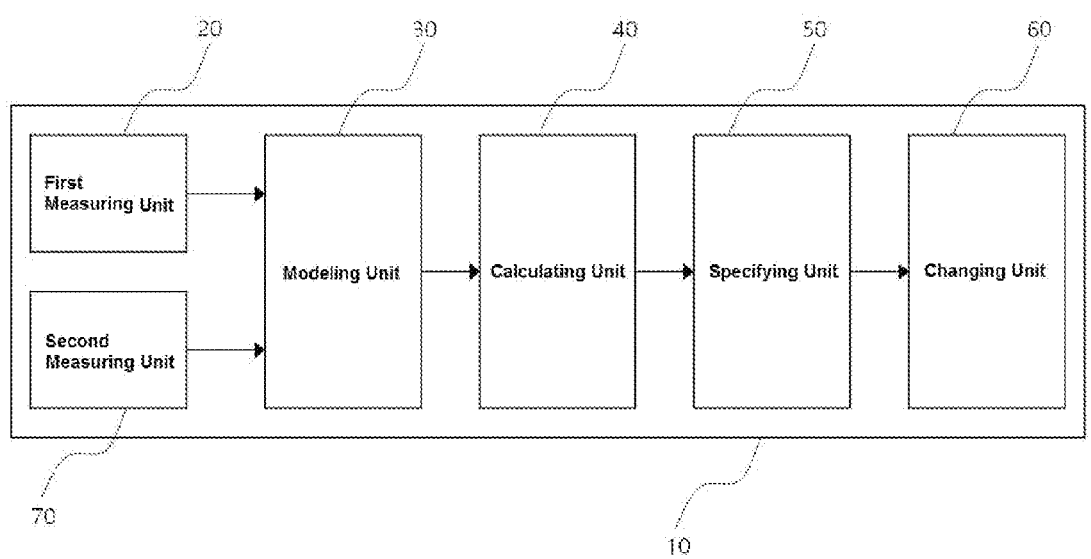
FIG. 13 is a schematic view illustrating a flight path searching apparatus for high altitude long endurance of an unmanned aerial vehicle based on regenerative fuel cells and solar cells according to an exemplary embodiment of the present invention.

As illustrated in FIG. 13, a flight path searching apparatus 10 for an unmanned aerial vehicle based on regenerative fuel cells and solar cells may include: a first measuring unit 20 of measuring amounts of hydrogen and oxygen retained in a regenerative fuel cell system; a modeling unit 30 of modeling the regenerative fuel cell system and a solar cell system supplying power required for the unmanned aerial vehicle to the unmanned aerial vehicle using design data of the regenerative fuel cell system and the solar cell system; a calculating unit 40 of calculating required power and amounts of generated hydrogen and oxygen and consumed hydrogen and oxygen depending on a plurality of preset flight paths having a change in a flight altitude on the basis of the measured amounts of retained hydrogen and oxygen using the regenerative fuel cell system and the solar cell system depending on a modeling result; and a specifying unit 50 of specifying a flight path through which the unmanned aerial vehicle may stay for the longest time using a calculated result value.

In addition, the flight path searching apparatus may further include a changing unit 60 of changing a flight path of the unmanned aerial vehicle based on regenerative fuel cells and solar cells to the flight path specified in the specifying unit 50.

In the calculating unit 40, the plurality of preset flight paths may include a first flight path through which the unmanned aerial vehicle performs a level flight during the night and performs a glide flight after a climb flight during the daytime, a second flight path through which the unmanned aerial vehicle performs a level flight during the night and performs a climb flight after a glide flight during the daytime, a third flight path through which the unmanned aerial vehicle performs a glide flight after a climb flight during the night and performs a level flight during the daytime, and a fourth flight path through which the unmanned aerial vehicle performs a climb flight after a glide flight during the night and performs a level flight during the daytime.

In addition, the flight path searching apparatus for an unmanned aerial vehicle based on regenerative fuel cells and solar cells may further include a second measuring unit 70 of measuring consumed power and amounts of generated hydrogen and oxygen and consumed hydrogen and oxygen depending on the flight path during the flight of the unmanned aerial vehicle, and in the modeling unit 30, the design data may be updated using actual measured data measured in the second measuring unit 70. Therefore, accuracy of prediction of the modeling may be increased, and finally, the flight path through which the unmanned aerial vehicle may stably stay for the longest time is re-searched in real time on the basis of actual data of the unmanned aerial vehicle that is currently being flown, thereby making it possible to predict an altitude at which the long endurance of the unmanned aerial vehicle is possible and a time in which the long endurance of the unmanned aerial vehicle is possible.

As equations and calculating methods required in the modeling unit 30 and the calculating unit 40, the equations and the calculating methods used in the flight path calculating method described above may be used.

In the calculating unit 40, amounts of hydrogen and oxygen generated through a water electrolyzer of the regenerative fuel cell system to which surplus energy except required power supplied to the unmanned aerial vehicle is transferred through the solar cell system during the daytime and amounts of hydrogen and oxygen consumed through the regenerative fuel cell system during the night may be calculated.

In the specifying unit 50, the flight path through which the unmanned aerial vehicle may stay for the longest time may be specified by analyzing the altitude at which the long endurance of the unmanned aerial vehicle is possible and the time in which the long endurance of the unmanned aerial vehicle is possible depending on the preset flight path.

Figure 14:
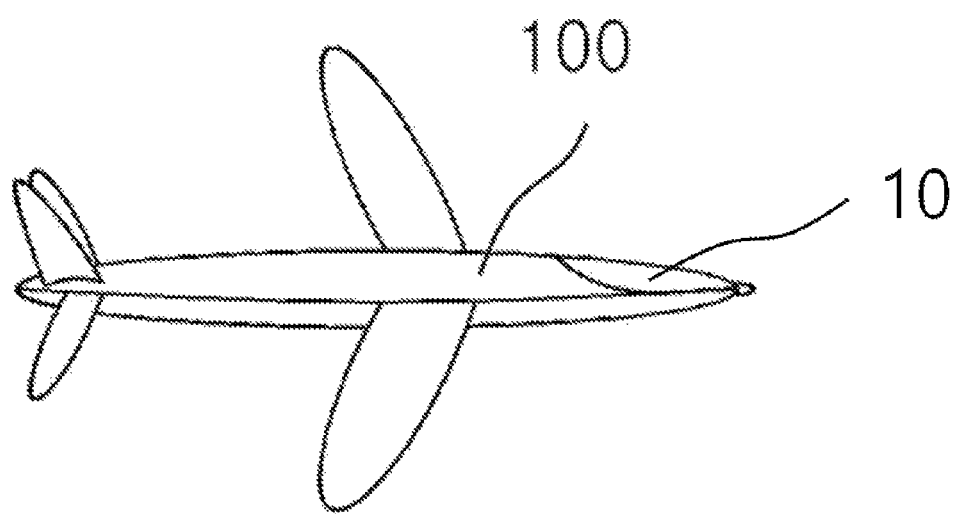
FIG. 14 is a schematic view illustrating an unmanned aerial vehicle comprising the flight path searching apparatus for high altitude long endurance of an unmanned aerial vehicle based on regenerative fuel cells and solar cells according to an exemplary embodiment of the present invention.

The flight path searching apparatus for an unmanned aerial vehicle based on regenerative fuel cells and solar cells may be included in an aircraft. The aircraft may include an unmanned aerial vehicle, a manned aerial vehicle, and a spacecraft, as illustrated in FIG. 14.

In this case, the flight path searching apparatus may include all of the features of the flight path searching apparatus for an unmanned aerial vehicle based on regenerative fuel cells and solar cells described above.

In the flight path calculating method for high altitude long endurance of an unmanned aerial vehicle based on regenerative fuel cells and solar cells having the configuration as described above, it is possible to calculate and provide a flight path most appropriate for the high altitude long endurance by comparing and analyzing amounts of consumed hydrogen and oxygen and amounts of generated hydrogen and oxygen in the unmanned aerial vehicle based on the regenerative fuel cells and the solar cells depending on various flight strategies through a simulation in order to continuously perform the high altitude (stratospheric) long endurance of the unmanned aerial vehicle based on regenerative fuel cells and solar cells.

Hereinabove, although the present invention has been described by specific matters such as detailed components, exemplary embodiments, and the accompanying drawings, they have been provided only for assisting in the entire understanding of the present invention. Therefore, the present invention is not limited to the exemplary embodiments. Various modifications and changes may be made by those skilled in the art to which the present invention pertains from this description.

Therefore, the spirit of the present invention should not be limited to these exemplary embodiments, but the claims and all of modifications equal or equivalent to the claims are intended to fall within the scope and spirit of the present invention.

What is claimed is:

1. A flight path calculating method for high altitude long endurance of an unmanned aerial vehicle based on regenerative fuel cells and solar cells, configured in a program form executed by an arithmetic processing means including a computer, comprising:
  a modeling step of performing modeling by receiving amounts of generated hydrogen and oxygen during the daytime and amounts of consumed hydrogen and oxygen during the night through a regenerative fuel cell system, and an amount of generated power through a solar cell system supplying required power for the high altitude long endurance of the unmanned aerial vehicle based on regenerative fuel cells and solar cells;
  a simulation step of performing a simulation for amounts of consumed hydrogen and oxygen and amounts of generated hydrogen and oxygen depending on a plurality of preset flight paths having a change in a flight altitude using the regenerative fuel cell system and the solar cell system depending on a modeling result in the modeling step; and
  an analyzing step of calculating a flight path with the largest value when the amounts of consumed hydrogen and oxygen are subtracted from the amounts of generated hydrogen and oxygen using a simulation result value for the amounts of consumed hydrogen and oxygen and the amounts of generated hydrogen and oxygen depending on the plurality of preset flight paths having the change in the flight altitude in the simulation step.

2. The flight path calculating method for high altitude long endurance of the unmanned aerial vehicle based on regenerative fuel cells and solar cells of claim 1, wherein at the time of a climb flight of the unmanned aerial vehicle based on regenerative fuel cells and solar cells, required power is defined as $P_{climb}$=TV=DV+WV sin θ through the following motion Equation:

$$T = D + W \sin\theta$$

at the time of a level flight of the unmanned aerial vehicle based on regenerative fuel cells and solar cells, required power is defined as $$P_{level} = TV = \sqrt{\frac{2W^3 C_D^2}{\rho S C_L^3}}$$

through the following motion Equation:

$$T = D = \frac{W}{C_L / C_D},$$

and at the time of a glide flight of the unmanned aerial vehicle based on regenerative fuel cells and solar cells, glide velocity is defined as $$V_{glide} = \sqrt{\frac{2W\cos\theta}{\rho S C_L}}$$

through the following lift force Equation:

$$L = W \cos\theta = 1/2 \rho V^2 S C_L,$$

where L is lift force, N,
D is drag force, N,
W is weight, N,
T is thrust force, N,
V is aircraft velocity,
$C_L$ is a lift coefficient,
$C_D$ is a drag coefficient,
ρ is an air density, kg/(m*s)
S is a wing area, m², and
θ is an angle of a flight path, rad.

3. The flight path calculating method for high altitude long endurance of the unmanned aerial vehicle based on regenerative fuel cells and solar cells of claim 1, wherein in the simulation step, for each of the plurality of preset flight paths having the change in the flight altitude, a simulation for amounts of hydrogen and oxygen generated using surplus energy remaining after the solar cell system supplies energy required in the unmanned aerial vehicle to the unmanned aerial vehicle through a water electrolysis system of the regenerative fuel cells during the daytime and amounts of hydrogen and oxygen consumed through the fuel cell system of the regenerative fuel cells during the night is performed.

4. The flight path calculating method for high altitude long endurance of the unmanned aerial vehicle based on regenerative fuel cells and solar cells of claim 1, wherein in the analyzing step, altitudes at which the long endurance of the unmanned aerial vehicle is possible and times in which the long endurance of the unmanned aerial vehicle is possible are analyzed for each of the preset flight paths using a simulation performing result value in the simulation step to calculate the flight path most appropriate for the high altitude long endurance of the unmanned aerial vehicle.

5. A flight path searching method for an unmanned aerial vehicle based on regenerative fuel cells and solar cells, comprising:
a retained amount measuring step of measuring amounts of hydrogen and oxygen retained in a regenerative fuel cell system;
a modeling step of modeling the regenerative fuel cell system and a solar cell system supplying power required for the unmanned aerial vehicle to the unmanned aerial vehicle using amounts of generated hydrogen and oxygen during the daytime and amounts of consumed hydrogen and oxygen during the night through the regenerative fuel cell system, and an amount of generated power through the solar cell system;
a calculating step of calculating required power and amounts of generated hydrogen and oxygen and consumed hydrogen and oxygen depending on a plurality of preset flight paths having a change in a flight altitude on the basis of a measured amounts of retained hydrogen and oxygen using the regenerative fuel cell system and the solar cell system depending on a modeling result;
a specifying step of specifying a flight path with the largest value when the amounts of consumed hydrogen and oxygen are subtracted from the amounts of generated hydrogen and oxygen using a result value calculated in the calculating step; and
a changing step of changing the flight path of the unmanned aerial vehicle to the flight path specified in the specifying step.

6. The flight path searching method for the unmanned aerial vehicle based on regenerative fuel cells and solar cells of claim 5, wherein the plurality of preset flight paths of the calculating step include a first flight path through which the unmanned aerial vehicle performs a level flight during the night and performs a glide flight after a climb flight during the daytime, a second flight path through which the unmanned aerial vehicle performs a level flight during the night and performs a climb flight after a glide flight during the daytime, a third flight path through which the unmanned aerial vehicle performs a glide flight after a climb flight during the night and performs a level flight during the daytime, and a fourth flight path through which the unmanned aerial vehicle performs a climb flight after a glide flight during the night and performs a level flight during the daytime.

7. The flight path searching method for the unmanned aerial vehicle based on regenerative fuel cells and solar cells of claim 5, further comprising a measuring step of measuring consumed power and amounts of generated hydrogen and oxygen and consumed hydrogen and oxygen depending on the flight path during the flight of the unmanned aerial vehicle.

8. The flight path searching method for an unmanned aerial vehicle based on regenerative fuel cells and solar cells of claim 7, further comprising an updating step of updating design data used in the modeling step using actual measured data measured in the measuring step.

9. The flight path searching method for the unmanned aerial vehicle based on regenerative fuel cells and solar cells of claim 6, wherein at a time of the climb flight of the unmanned aerial vehicle based on regenerative fuel cells and solar cells, required power is defined as $P_{climb}$=TV=DV+WV sin θ through the following motion Equation:

$$T = D + W \sin\theta$$

at a time of the level flight of the unmanned aerial vehicle based on regenerative fuel cells and solar cells, required power is defined as $$P_{level} = TV = \sqrt{\frac{2W^3 C_D^2}{\rho S C_L^3}}$$

through the following motion Equation:

$$T = D = \frac{W}{C_L/C_D},$$

and at the time of the glide flight of the unmanned aerial vehicle based on regenerative fuel cells and solar cells, glide velocity is defined as $$V_{glide} = \sqrt{\frac{2W\cos\theta}{\rho S C_L}}$$

through the following lift force Equation:

$L = W\cos\theta = 1/2\rho V^2 S C_L,$ where L is lift force, N,
D is drag force, N,
W is weight, N,
T is thrust force, N,
V is aircraft velocity,
$C_L$ is a lift coefficient,
$C_D$ is a drag coefficient,
θ is an air density, kg/(m*s),
S is a wing area, m², and
θ is an angle of a flight path, rad.

10. The flight path searching method for the unmanned aerial vehicle based on regenerative fuel cells and solar cells of claim 6, wherein in the calculating step, amounts of hydrogen and oxygen generated through a water electrolyzer of the regenerative fuel cell system to which surplus energy except required power supplied to the unmanned aerial vehicle through the solar cell system is transferred during the daytime and amounts of hydrogen and oxygen consumed through the regenerative fuel cell system during the night are calculated.

11. The flight path searching method for the unmanned aerial vehicle based on regenerative fuel cells and solar cells of claim 5, wherein in the specifying step, the flight path through which the unmanned aerial vehicle stays for the longest time is specified by analyzing an altitude at which long endurance of the unmanned aerial vehicle is possible and a time in which the long endurance of the unmanned aerial vehicle is possible depending on the preset flight path using the result value calculated in the calculating step.

12. A flight path searching apparatus for an unmanned aerial vehicle based on regenerative fuel cells and solar cells, comprising:
a first measuring unit of measuring amounts of hydrogen and oxygen retained in a regenerative fuel cell system;
a modeling unit of modeling the regenerative fuel cell system and a solar cell system supplying power required for the unmanned aerial vehicle using amounts of generated hydrogen and oxygen during the daytime and amounts of consumed hydrogen and oxygen during the night through the regenerative fuel cell system, and an amount of generated power through the solar cell system;
a calculating unit of calculating required power and amounts of generated hydrogen and oxygen and consumed hydrogen and oxygen depending on a plurality of preset flight paths having a change in a flight altitude on the basis of a measured amounts of retained hydrogen and oxygen using the regenerative fuel cell system and the solar cell system depending on a modeling result; and
a specifying unit of specifying a flight path with the largest value when the amounts of consumed hydrogen and oxygen are subtracted from the amounts of generated hydrogen and oxygen using a calculated result value.

13. The flight path searching apparatus for the unmanned aerial vehicle based on regenerative fuel cells and solar cells of claim 12, further comprising a changing unit of changing a flight path of the unmanned aerial vehicle based on regenerative fuel cells and solar cells to the flight path specified in the specifying unit.

14. The flight path searching apparatus for the unmanned aerial vehicle based on regenerative fuel cells and solar cells of claim 12, wherein in the calculating unit, the plurality of preset flight paths include a first flight path through which the unmanned aerial vehicle performs a level flight during the night and performs a glide flight after a climb flight during the daytime, a second flight path through which the unmanned aerial vehicle performs a level flight during the night and performs a climb flight after a glide flight during the daytime, a third flight path through which the unmanned aerial vehicle performs a glide flight after a climb flight during the night and performs a level flight during the daytime, and a fourth flight path through which the unmanned aerial vehicle performs a climb flight after a glide flight during the night and performs a level flight during the daytime.

15. The flight path searching apparatus for the unmanned aerial vehicle based on regenerative fuel cells and solar cells of claim 12, further comprising a second measuring unit of measuring consumed power and amounts of generated hydrogen and oxygen and consumed hydrogen and oxygen depending on the flight path during the flight of the unmanned aerial vehicle based on regenerative fuel cells and solar cells.

16. The flight path searching apparatus for the unmanned aerial vehicle based on regenerative fuel cells and solar cells of claim 15, wherein in the modeling unit, the design data are updated using actual measured data measured in the second measuring unit.

17. The flight path searching apparatus of claim 14, wherein in the calculating unit, amounts of hydrogen and oxygen generated through a water electrolyzer of the regenerative fuel cell system to which surplus energy except required power supplied to the unmanned aerial vehicle through the solar cell system is transferred during the daytime and amounts of hydrogen and oxygen consumed through the regenerative fuel cell system during the night are calculated.

18. The flight path searching apparatus for the unmanned aerial vehicle based on regenerative fuel cells and solar cells of claim 12, wherein in the specifying unit, the flight path through which the unmanned aerial vehicle stays for the longest time is specified by analyzing an altitude at which long endurance of the unmanned aerial vehicle is possible and a time in which the long endurance of the unmanned aerial vehicle is possible depending on the preset flight path.

* * * * *